INVENTOR.
Ferdinand J. Ratti,
BY
Cromwell, Greist & Warden
Attys.

March 1, 1960
F. J. RATTI
2,926,938
OIL SEAL
Filed June 3, 1953
2 Sheets-Sheet 2
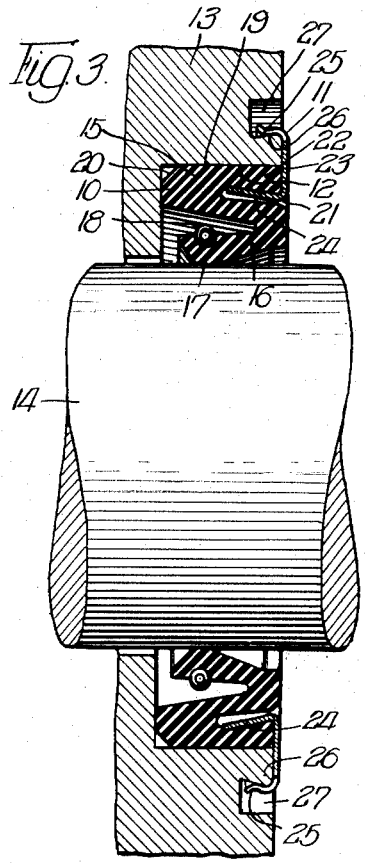
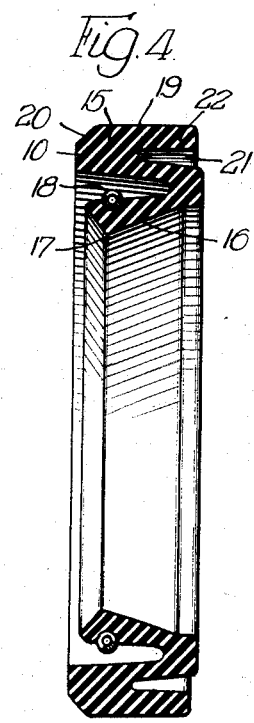
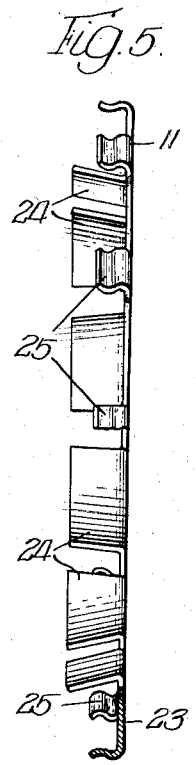
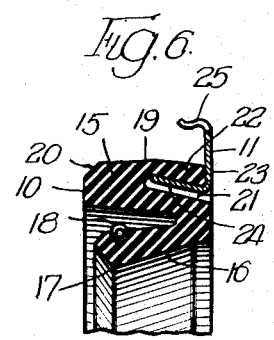
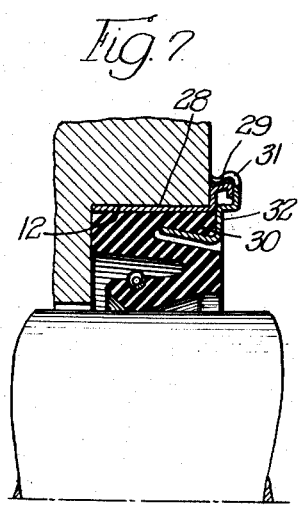
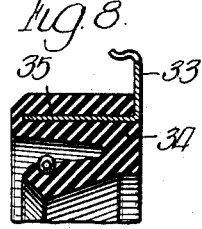
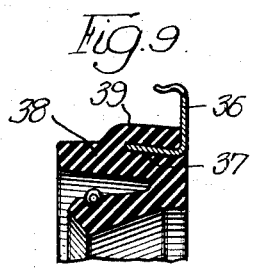
INVENTOR.
Ferdinand J. Ratti,
BY
Cromwell, Greist + Warden
Attys.

United States Patent Office 2,926,938
Patented Mar. 1, 1960

2,926,938

OIL SEAL

Ferdinand J. Ratti, Far Hills, N.J., assignor to Chicago Rawhide Manufacturing Company, Chicago, Ill., a corporation of Illinois Application June 3, 1953, Serial No. 359,325

5 Claims. (Cl. 286—5)

This invention has to do with oil seals of the type adapted for installation in a bore in a housing about a relatively movable centrally located shaft for sealing off the space between the housing and the shaft.

Seals of this type have heretofore usually been provided with sheet steel casings, in the form of cup-shaped stampings, and have been installed in steel housings by being made slightly oversized and then press-fitted into the bores in the housings under substantial endwise pressure.

For many applications such seals have been entirely satisfactory, in that the seals are held securely in place by the metal-to-metal press-fit engagement, are sealed effectively against leakage within the bores, and yet can be withdrawn from the bores without too much difficulty and without injury to the bores when it is necessary to either partially or wholly disassemble the machines or to replace no longer serviceable seals with new ones.

Such seals have not proven satisfactory, however, for use in certain kinds of equipment in which the housings into which the seals must be press-fitted are of necessity made of lighter or different metals, for example, aluminum alloys, as in the construction of certain types of aircraft engines, and particularly jet engines. Special metals of that sort will not stand up under the forces and pressures to which subjected in connection with press-fit installations, particularly when the seals must be removed for one reason or another from time to time and replaced. It is found that the metal of the housing will quickly become scored or otherwise mutilated to a point where when a new seal is installed it will fail to hold and leakage will develop about the outside of the same. As equipment of this sort is usually of special design and extremely expensive and difficult to replace, particularly in the field, it has not proven satisfactory to press-fit steel encased seals into such housings.

It has been proposed in this connection to employ seals in which either the entire seal or the outer press-fit portion of the same is made of a synthetic rubber compound. Such so-called rubber seals are of course easy to press-fit into position, and they will not mar the bores in the housings, but they have not been satisfactory for such applications because of the fact that the rubber is inclined after a time to take a set and loosen up to a point where the seals are no longer securely held in place and in any event will not prevent at least some leakage.

The object of the present invention is to provide a seal which can be installed easily in the bore of a housing made of relatively soft metal, which can be removed and replaced with equal facility without mutilation of the sealing surface of the bore, and which will establish and indefinitely maintain a good fluid-tight relationship between the outer periphery of the seal and the inside of the bore.

While the foregoing statements are indicative in a general way of the nature of the invention, other objects and advantages will be apparent to those skilled in the art upon a full understanding of the construction of the new seal and the manner in which it is installed and maintained in position.

A preferred embodiment and a few modifications of the invention are presented herein by way of illustration, but it will of course be appreciated that the invention is susceptible of incorporation in other forms coming equally within the purview of the invention and the scope of the appended claims.

In the accompanying drawings:

Fig. 3 is a diametric section taken through the same housing, shaft and seal assembly;

Fig. 4 is a diametric section through the seal proper, with the metal clip-on member removed;

Fig. 5 is a side view of the clip-on member, with the lower portion of the same shown in section;

Fig. 6 is a radial section through the same seal assembly, before insertion in the bore in the housing; and Figs. 7, 8 and 9 show various modifications.

Figure 1:
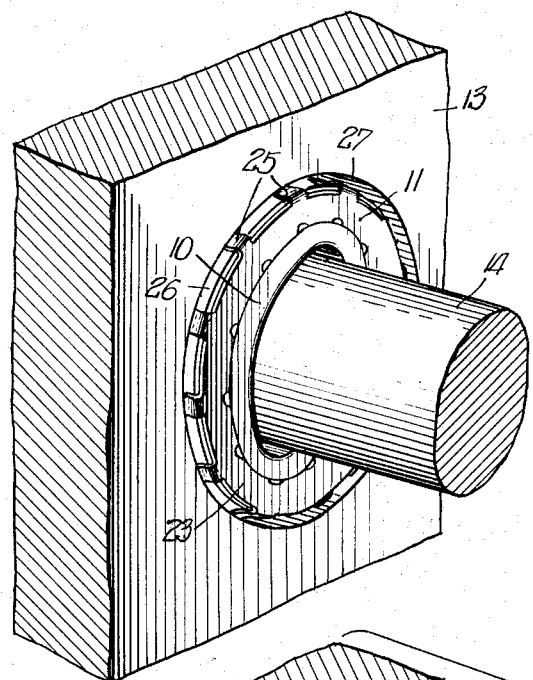
Fig. 1 is a perspective view of a seal constructed in accordance with the invention, showing the seal installed within a bore in a housing about a centrally located shaft.
Figure 2:
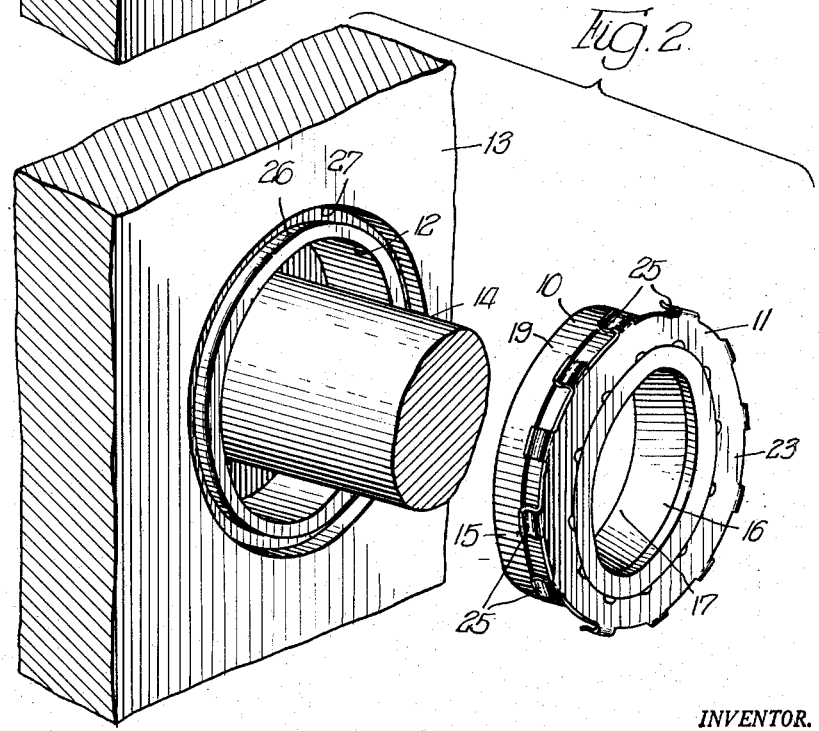
Fig. 2 is a similar perspective view, showing the seal removed endwise from the bore in the housing.

Describing first the construction shown in Figs. 1 to 6, inclusive, of the drawings, it will be observed that the seal, which includes primarily a synthetic rubber sealing ring 10 and a spring metal clip-on ring 11, is adapted to be associated with a bore 12 in a housing 13 about a relatively movable centrally located shaft 14, with the sealing ring 10 positioned in the bore and with the clip-on ring 11 positioned against the housing at the open end of the bore.

The sealing ring 10, which may be either partially or wholly made of synthetic rubber or of other suitable resiliently deformable packing material, is characterized by a thick substantially cylindrical block-like outer bore-engaging portion 15 of generally rectangular form, and by an inner shaft-engaging portion 16 for running fluid-tight contact with the shaft. The inner shaft-engaging portion 16, which may or may not be made integral with the outer bore-engaging portion 15, preferably terminates at the shaft in a flexible lip 17 which has but limited contact with the shaft, and is preferably provided with spring means, such as a garter spring 18 or the like, for constricting the lip 17 about the shaft. The shaft-engaging portion 16 can, however, be of any other suitable form and the spring means can be omitted if desired.

The outer periphery 19 of the outer bore-engaging portion 15 of the sealing ring is of somewhat larger diameter than the bore 12 in the housing 13 and is preferably beveled at one end at 20 to facilitate insertion in the bore. The bore-engaging portion 15 is provided inwardly of its outer periphery 19 with a relatively narrow and deep annular slot 21, which slot is concentric with the outer periphery 19 and extends axially a substantial distance into the bore-engaging portion 15 from one end of the latter, leaving between the slot 21 and the outer periphery 19 of the bore-engaging portion 15 a thick outwardly distensible band-like formation 22, for a purpose which will hereinafter be described.

The clip-on ring 11, which is preferably though not necessarily made as a one-piece spring metal stamping, is characterized by a substantially rigid washer-like portion 23, which portion is adapted to be positioned more or less flatwise against the slotted end of the outer bore-engaging portion 15 of the sealing ring. The ring 11 is provided, about the inner periphery of the portion 23, with a plurality of axially extending outwardly biased spring fingers 24 for insertion in the slot 21 in outwardly clamped engagement with the band-like formation 22 surrounding such fingers. At its outer periphery the portion 23 of the ring 11 is provided with a plurality of relatively short axially extending inwardly biased spring hooks 25 for use in detachably connecting the seal assembly to the housing 13 at the open end of the bore 12.

To afford means for such attachment the housing 13 is provided, outwardly of the open end of the bore 12, with an annular shoulder 26, which shoulder may consist of the inner wall of a groove 27 formed in the face of the housing concentrically with and outwardly of the bore 12 as shown in the drawings, or may consist of the outer surface of an axially projecting bead-like formation.

The spring fingers 24 on the clip-on ring 11 are preferably located as close as practicable to each other, in order to present a more or less circumferentially continuous outward pressure on the band-like formation 22, while the spring hooks 25 may be spaced substantially from each other and still afford the desired retention.

In installing the new seal assembly the clip-on ring 11 is preferably assembled first with the sealing ring 10, causing the outer periphery 19 of the bore-engaging portion 15 of the sealing ring, which is already of slightly larger size than the bore 12 in the housing, to be expanded throughout a substantial part of its length to a still larger size, as illustrated for instance in Fig. 6. The sealing ring 10 is then forced axially into the bore 12, causing the band-like formation 22 of the outer portion of the sealing ring to be contracted against the opposing spring action of the fingers 24 to the cylindrical form shown in Fig. 3. At the same time the spring hooks 25 are snapped over the annular shoulder on the housing about the open end of the bore, thereby securely retaining both the sealing ring 10 and the clip-on ring 11 in position.

Inasmuch as the outer periphery 19 of the bore-engaging portion 15 of the sealing ring, or at least a substantial portion of the outer periphery, is thereafter maintained under spring pressure in snug engagement with the bore 12, any tendency of the initially oversize outer periphery to take a set or lose its frictional engagement with the bore will be continuously resisted by the expansive action of the spring fingers and the seal will function indefinitely for the purpose intended. To remove the seal it is merely necessary to pry the spring hooks free from the shoulder 26, whereupon both the clip-on ring 11 and the sealing ring 10 can be removed.

In the modification shown in Fig. 7 a sheet metal adapter ring 28 is more or less permanently press-fitted or otherwise secured in the bore 12 in the housing and is provided outwardly of the end of the bore with an annular bead-like formation 29. The oversize sealing ring 30 is then pressed, not directly into the bore, but rather into the adapter ring 28, and the spring hooks 31 on the clip-on ring 32 are snapped over the bead-like formation 29 on the adapter ring. By using such an adapter it is of course not necessary to machine the face of the housing to provide an integral shoulder formation for coaction with the hooks on the clip-on ring.

As an alternative the annular bead-like formation 29 on the adapter ring 28, instead of being made relatively non-yielding, may be constructed as a plurality of resiliently yieldable inwardly deflectable spring fingers, and the cooperating outer portion of the ring 32, instead of being in the form of a plurality of resiliently yieldable spring fingers, may be constructed as a relatively non-yieldable rim, within which rim the spring fingers on the adapter ring may be sprung to seceure the sealing ring 30 in position.

In the modification shown in Fig. 8 the clip-on ring 33 serves merely to provide a snap connection between the sealing ring 34 and the housing. The outer periphery of the sealing ring, instead of being expanded outwardly by spring pressure as in the previously described forms, is merely reinforced by a continuous cylindrical flange 35, which flange is of rigid construction and may be molded within the outer portion of the sealing ring.

In the modification shown in Fig. 9 the clip-on ring 36, as in the first two described embodiments, is provided about its inner periphery with outwardly biased spring fingers 37, but in this form the spring fingers are molded within the outer portion of the sealing ring 38 in a unitary formation.

As also shown in this last described modification, the outer periphery of the sealing ring 38, instead of engaging with the bore 12 in the housing throughout the length of such bore, may be provided with but a limited contact portion 39. This limited contact feature, which permits of a localized and consequently increased outward sealing pressure, may of course be employed in connection with any of the other embodiments shown.

While the outer periphery of the rubber-like sealing member in each of the embodiments shown has been described as being initially oversize with respect to the bore in which the same is adapted to be positioned, the outer periphery may be made the same size as the bore and only that portion thereof which surrounds the spring fingers expanded into engagement under pressure with the bore to effect the necessary fluid-tight joint.

In each of the embodiments shown it will be appreciated that rotation of the seal relative to the housing is resisted, not only by the frictional engagement of the outer periphery of the seal with the bore in the housing, but also by the jaw-like engagement between the attaching ring and housing.

I claim:

1. A seal for insertion in a cylindrical bore in a housing about a relatively movable centrally located shaft, comprising an annular bore-engaging mounting portion of resiliently deformable material for endwise insertion in and statically sealed engagement with the bore in the housing, an annular shaft-engaging portion connected with said bore-engaging portion for running engagement with the shaft, and a metal ring located adjacent one end of said bore-engaging portion, said ring being provided with a plurality of axially extending outwardly biased spring fingers in outwardly clamped engagement with said bore-engaging portion inwardly of the outer periphery of the latter, and said ring being also provided outwardly of said bore-engaging portion with means for detachably connecting the ring to the housing outwardly of the bore in the latter.

2. A seal for insertion in a cylindrical bore in a housing about a relatively movable centrally located shaft, comprising a thick substantially cylindrical bore-engaging mounting portion of resiliently deformable material for endwise insertion in and statically sealed engagement with the bore in the housing, which portion is of somewhat larger diameter than the bore, said bore-engaging portion being provided inwardly of its outer periphery with an annular slot, which slot is concentric with said outer periphery and extends axially from one end of said portion, an annular shaft-engaging portion connected with said bore-engaging portion for running engagement with the shaft, and a metal ring located adjacent one end of said bore-engaging portion, said ring being provided about its inner periphery with a plurality of axially extending outwardly biased spring fingers for insertion in said slot in outwardly clamped engagement with said bore-engaging portion, and said ring being also provided outwardly of said bore-engaging portion with means for detachably connecting the ring to the housing outwardly of the bore in the latter.

3. A seal for insertion in a cylindrical bore in a housing about a relatively movable centrally located shaft, comprising a bore-engaging portion of resiliently deformable material, said bore-engaging portion being provided inwardly of its outer periphery with an annular slot, which slot is concentric with said outer periphery and extends axially from one end of said portion, an annular shaft-engaging portion connected with said bore-engaging portion for running engagement with the shaft, and a metal ring located adjacent one end of said bore-engaging portion, said ring being provided about its inner periphery with a plurality of axially extending outwardly biased spring fingers for insertion in said slot in outwardly clamped engagement with said bore-engaging portion, and said ring being also provided outwardly of said bore-engaging portion with a plurality of axially extending inwardly biased spring hooks for detachably connecting the ring to an annular formation associated with the housing outwardly of the bore in the latter.

4. A seal for insertion in a cylindrical bore in a housing about a relatively movable centrally located shaft, comprising a sealing ring having an outer bore-engaging portion of resiliently deformable material for insertion in the bore, and a metal retaining ring associated with the sealing ring, said retaining ring being provided with means which act resiliently outward against the bore-engaging portion of the sealing ring and being provided with other means for detachably connecting the retaining ring to the housing.

5. A seal for insertion in a cylindrical bore in a housing about a relatively movable centrally located shaft, comprising a sealing ring having an outer bore-engaging portion of resiliently deformable material, which portion is of somewhat larger diameter than the bore in the housing, for press-fit insertion in the bore, and a metal retaining ring associated with the sealing ring, said retaining ring being connected with the sealing ring and being provided outwardly of the latter with resiliently yieldable hook formations which are adapted to be sprung into interlocking engagement with a complementary formation associated with the housing outwardly of the bore, which engagement acts to prevent axial displacement of the sealing ring relative to the bore in the housing.

References Cited in the file of this patent

UNITED STATES PATENTS

| | | |
|---|---|---|
| 1,546,942 | Roth | July 21, 1925 |
| 1,951,034 | Norton | Mar. 13, 1934 |
| 2,544,324 | Jepson | Mar. 6, 1951 |
| 2,631,906 | Brock | Mar. 17, 1953 |

FOREIGN PATENTS

| | | |
|---|---|---|
| 578,526 | Great Britain | July 6, 1946 |